(12) United States Patent
Neemidge et al.

(10) Patent No.: US 8,271,706 B2
(45) Date of Patent: Sep. 18, 2012

(54) STABILIZATION OF HOST TO STORAGE SUBSYSTEM OWNERSHIP

(75) Inventors: John L. Neemidge, Austin, TX (US); Nishant B. Shah, Austin, TX (US); Stephen M. Tee, Marble Falls, TX (US); Teerasit Tinnakul, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 12/125,633

(22) Filed: May 22, 2008

(65) Prior Publication Data
US 2009/0292834 A1 Nov. 26, 2009

(51) Int. Cl.
*G06F 3/00* (2006.01)
*G06F 5/00* (2006.01)
*G06F 13/12* (2006.01)
*G06F 13/38* (2006.01)

(52) U.S. Cl. .............. 710/74; 710/19; 710/36
(58) Field of Classification Search .......... 710/19, 710/36, 74
See application file for complete search history.

(56) References Cited

U.S. PATENT DOCUMENTS

| | | | |
|---|---|---|---|
| 5,870,537 A * | 2/1999 | Kern et al. ............ 714/6 |
| 5,975,738 A | 11/1999 | DeKoning et al. |
| 5,999,930 A | 12/1999 | Wolff |
| 6,622,263 B1 | 9/2003 | Stiffler et al. |
| 7,010,660 B2 | 3/2006 | Mimatsu et al. |
| 7,203,862 B2 | 4/2007 | Fujimoto |
| 7,216,263 B2 | 5/2007 | Takaoka et al. |
| 7,257,680 B2 | 8/2007 | Shimada |
| 7,293,195 B1 | 11/2007 | Watanabe et al. |
| 7,328,263 B1 | 2/2008 | Sadjadi |
| 7,328,324 B2 * | 2/2008 | Wang et al. ............ 711/173 |
| 7,360,030 B1 | 4/2008 | Georgiev |
| 7,363,437 B2 | 4/2008 | Miki |
| 7,509,535 B1 | 3/2009 | Gulve et al. |
| 7,613,947 B1 | 11/2009 | Coatney et al. |
| 7,650,412 B2 | 1/2010 | Coatney et al. |
| 7,730,274 B1 | 6/2010 | Usgaonkar |
| 2003/0200389 A1 * | 10/2003 | Odenwald, Jr. ............ 711/114 |
| 2003/0204786 A1 | 10/2003 | Dinker et al. |

(Continued)

OTHER PUBLICATIONS

McCarthy, Christopher S.; Non-Final Office Action; Sep. 13, 2010; U.S. Appl. No. 12/197,678; USPTO
Neemidge; Response to Non-Final Office Action; Dec. 9, 2010; U.S. Appl. No. 12/197,678.

(Continued)

*Primary Examiner* — Henry Tsai
*Assistant Examiner* — Kris Rhu
(74) *Attorney, Agent, or Firm* — Robert C. Rolnik; David A. Mims

(57) ABSTRACT

The present invention provides a computer implemented method and apparatus to revising logical unit ownership in a host. A host receives an error message from a storage subsystem having at least two storage controllers and at least one logical unit coupled to at least one of the storage controllers. The host suspends I/O from the host to the storage subsystem. The host transmits a verification of logical unit ownership query to the storage subsystem. The host determines that ownership between a host and a logical unit on the at least one of the storage controllers has changed from a mapping table of the host. Responsive to a determination that ownership has changed, the host updates ownership in a mapping table of the host to reflect the ownership between the host and the logical unit. The host resumes I/O from the host to the storage subsystem, wherein the host routinely exchanges I/O with the storage subsystem.

20 Claims, 3 Drawing Sheets

U.S. PATENT DOCUMENTS

| | | | |
|---|---|---|---|
| 2005/0102603 A1 | 5/2005 | Tapper et al. | |
| 2005/0114730 A1 | 5/2005 | Iwamura et al. | |
| 2006/0156055 A1* | 7/2006 | Cherian et al. | 714/4 |
| 2006/0168228 A1* | 7/2006 | Vasudevan et al. | 709/226 |
| 2006/0253621 A1 | 11/2006 | Brewer et al. | |
| 2007/0028057 A1* | 2/2007 | Taguchi | 711/152 |
| 2008/0104359 A1* | 5/2008 | Sauer et al. | 711/202 |
| 2008/0201544 A1* | 8/2008 | Nakajima et al. | 711/166 |
| 2009/0063668 A1 | 3/2009 | Bish et al. | |
| 2009/0292834 A1 | 11/2009 | Neemidge et al. | |

OTHER PUBLICATIONS

McCarthy, Christopher S.; Final Office Action; Dec. 29, 2010; U.S. Appl. No. 12/197,678; USPTO.

Neemidge; Request for Continued Examination; Mar. 25, 2011; U.S. Appl. No. 12/197,678.

McCarthy, Christopher S.; Office Action; Apr. 11, 2011; U.S. Appl. No. 12/197,678; USPTO.

McCarthy, Christopher S.; Final Office Action; Jul. 13, 2011; U.S. Appl. No. 12/197,678; USPTO.

* cited by examiner

STABILIZATION OF HOST TO STORAGE SUBSYSTEM OWNERSHIP

BACKGROUND OF THE INVENTION

1. Field of the Invention

The present invention relates generally to a computer implemented method, data processing system, and computer program product for stabilizing port addressing. More specifically, the present invention relates to establishing consistent addressing of a host to a controller contemporaneous with logical unit ownership changes.

2. Description of the Related Art

Architects of modern data processing systems have expanded storage capacity present in hard drives and other storage media. A recent innovation has been the ability to place multiple drives under the control of a common storage controller to form a storage subsystem. Storage subsystems provide an ability to form redundant disk arrays, as well as improve the ability to scale a system as a customer's data processing needs grow.

A storage subsystem is an assembly of at least two storage controllers and at least one logical unit or logical unit number (LUN) coupled to at least one of the storage controllers. A storage controller is a communication device that includes a processor and memory, as well as a port to a network. The network can be a fibre channel based network, or other forms of storage area networks (SAN). Fibre channel is a gigabit speed networking technology primarily used for SAN. Fibre channel may be in any form promulgated by the International Committee for Information Technology Standards (INCITS). Accordingly, the typical storage subsystem is robust in the sense that it can support a failure in one of its storage controllers and still provide speedy access to data of the various disk media.

One configuration of a storage subsystem is to arrange storage controllers as an active/passive array. Active/passive arrays allow I/O operations to take place over a primary storage controller. I/O or input/output is data transferred to or through a conductor or node. In this situation, the second storage controller is called a passive storage controller, while the primary storage controller carries I/O along an active path.

Occasionally, a hard disk drive may attempt to enter a quiesced state. The hard disk may attempt this state transition to respond to an error. However, the hard disk drive may attempt this state transition because of a change in ownership between the LUN to which the disk drive belongs and a storage controller. From a perspective of a prior art host, an active storage controller has failed, and the host is required to access LUNs through the passive storage controller. Accordingly, the prior art host would issue ownership change commands. Where multiple hosts rely on the same storage controller, the multiple hosts could issue ownership change commands that delay resumption of I/O from the hosts to their respective LUNs in the storage subsystem.

Consequently, a benefit may occur if such a delay could be reduced from that experienced by the prior art.

SUMMARY OF THE INVENTION

The present invention provides a computer implemented method and apparatus to revising logical unit ownership in a host. A host receives an error message from a storage subsystem having at least two storage controllers and at least one logical unit coupled to at least one of the storage controllers. The host suspends I/O from the host to the storage subsystem. The host transmits a verification of logical unit ownership query to the storage subsystem. The host determines that ownership between a host and a logical unit on the at least one of the storage controllers has changed from a mapping table of the host. Responsive to a determination that ownership has changed, the host updates ownership in a mapping table of the host to reflect the ownership between the host and the logical unit. The host resumes I/O from the host to the storage subsystem, wherein the host routinely exchanges I/O with the storage subsystem.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
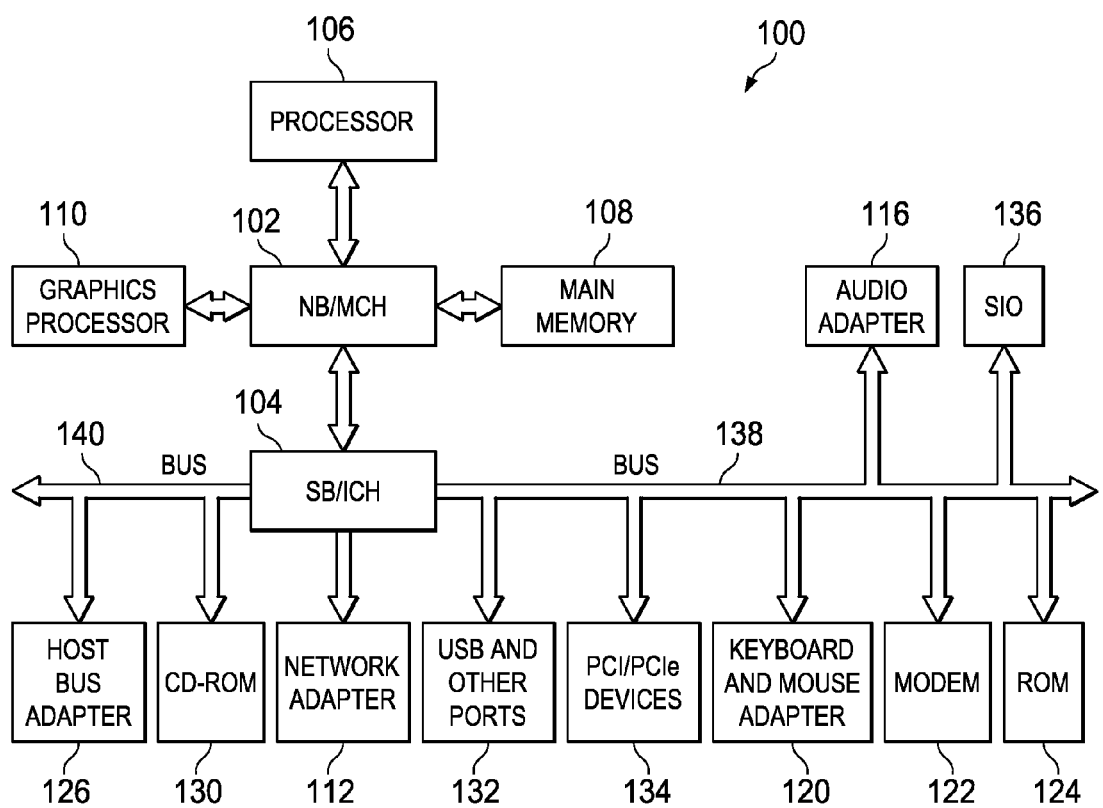
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, host bus adapter (HBA) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such storage subsystems accessible through as host bus adapter 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for modifying or aborting LUN ownership change commands. As a result, when an active/passive array storage subsystem enters a quiescent state, the host can resume I/O to the affected storage subsystem earlier than possible in known systems.

Figure 2:
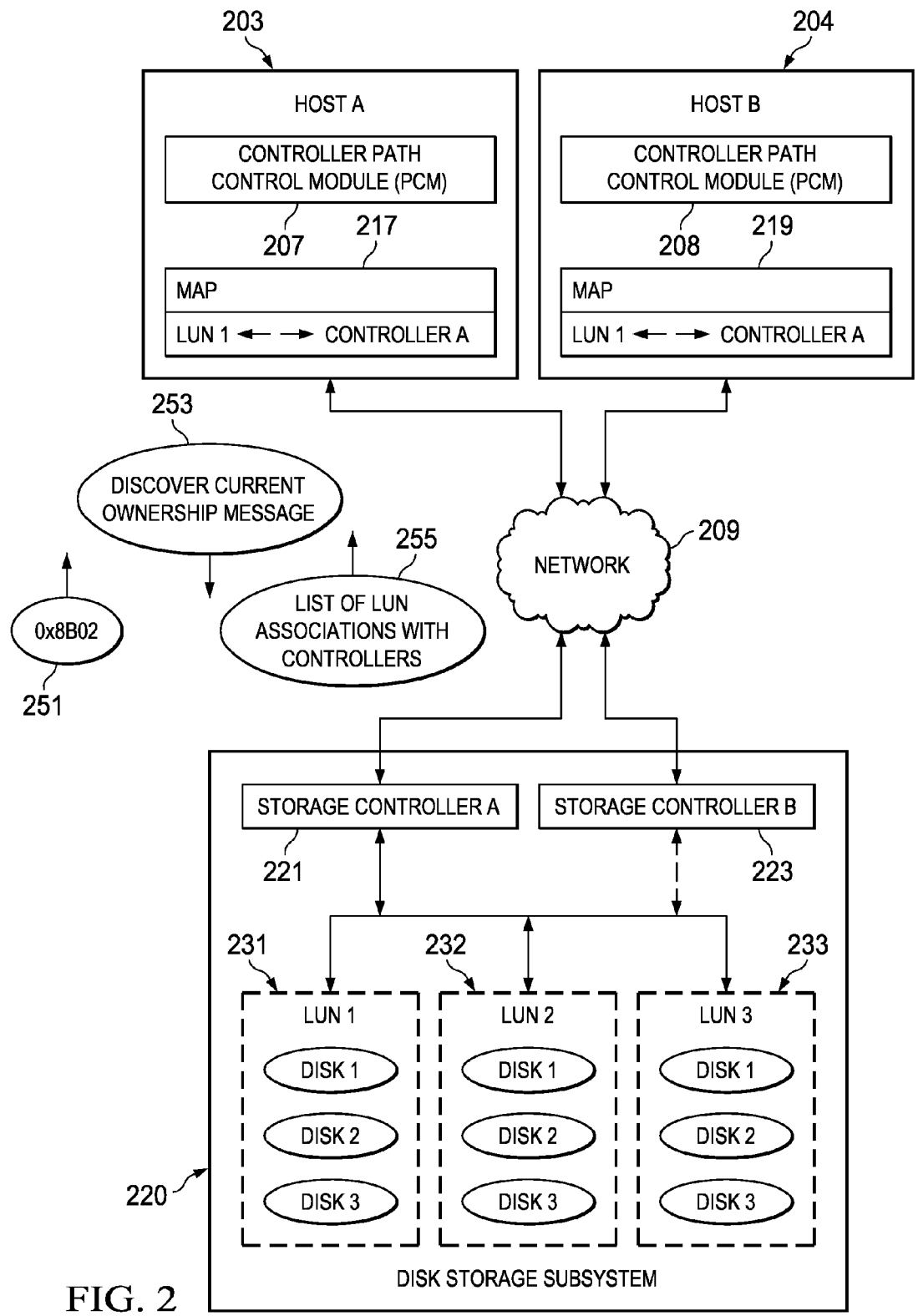
FIG. 2 is a storage area network that supports multiple hosts in accordance with an illustrative embodiment of the invention.

FIG. 2 is a storage area network that supports multiple hosts in accordance with an illustrative embodiment of the invention. Host A 203 and host B 204 are data processing systems. Each host may be, for example, an example of data processing system 100 of FIG. 1. A host is a data processing system that accesses a Storage Area Network (SAN). The storage subsystem may connect to the host via a host bus adapter. Within each host, support for the function of accessing storage is performed by the controller path control module (PCM). Thus, host A 203 relies on controller PCM 207, and host B 204 relies on controller PCM 208 to communicate with storage media. Accordingly, network 209 may provide a means to connect to a storage subsystem such as disk storage subsystem 220.

Disk storage subsystem 220 is accessed via storage controller A 221 and storage controller B 223. Storage controllers A and B are examples of storage controllers. As such, each storage controller is in one of two states with respect to a given LUN: active state or passive state. As depicted in FIG. 2, storage controller A 221 is active while storage controller B 223 is passive. Accordingly, host a 203 and host B 204 direct messages to storage controller A 221 for purposes of accessing media under the control of disk storage subsystem 220. Within the disk storage subsystem are arrays of disks.

One or more disks are organized into logical units. A logical unit or logical unit number (LUN) is one or more disk drives that are addressable as a unit that is presented to a host via one or more storage controllers. A logical unit may be addressable using protocols such as Small Computer System Interface (SCSI), Fibre Channel Protocol (FCP), HyperSCSI, among others, depending on the capabilities of the applicable storage controller. Consequently, disk storage subsystem 220 is comprised of LUN 1 231, LUN 2 232, and LUN 3 233.

Each controller regulates the arrival and departure of data to be written to, as well as read from, the LUNs. Such data can be I/O transferred to or through a conductor or node, and may be information or instructions that are compressed or uncompressed, corrupted or uncorrupted. I/O may be considered to be suspended if the signals are not passed in any form to a targeted device. A processor may buffer write operations during intervals that I/O is suspended to a LUN that is the target of such write operations. Processors may have limited amounts of memory that can be used to buffer such operations. The storage controllers, storage controller A 221, and storage controller B 223 can be fibre channel controllers. A fibre channel controller is a storage controller configured to handle I/O transferred across a fibre channel.

Each host relies on a mapping table to direct the addressing of a controller PCM for storage operations. A mapping table is a data structure that establishes associations between a storage controller and one or more logical units. The mapping table is accessible to a host, and may be stored to memory or to local storage. Mapping table 217 is a table stored to memory of host A 203. A similar mapping table, mapping table 219, is present in host B 204. A mapping table depicts the association of LUN 1 231 with storage controller A 221.

In contrast, each storage controller has a list of logical unit number associations. A list of logical unit number associations is a list of one or more logical unit associations with one or more storage controllers. Such a list is formed at a disk storage subsystem, and can be transmitted to a host. The list of logical unit number associations can be a single association of a LUN to a storage controller.

Although FIG. 2 shows storage controller A 221 as the active storage controller, storage controller B 223 can become the active storage controller. Host A 203 and host B 204 can change the active storage controller to become storage controller B 223. Such a change can change the ownership of LUNs, such as LUN 1 231, LUN 2 232, and LUN 3 233 to be owned by storage controller B 223.

Messages that may be passed between a storage controller and a host include an error message 251, described further below. A host may respond to the error message with discover current ownership message 253. A storage controller can further respond with a list of LUN associations with controllers 255.

Figure 3:
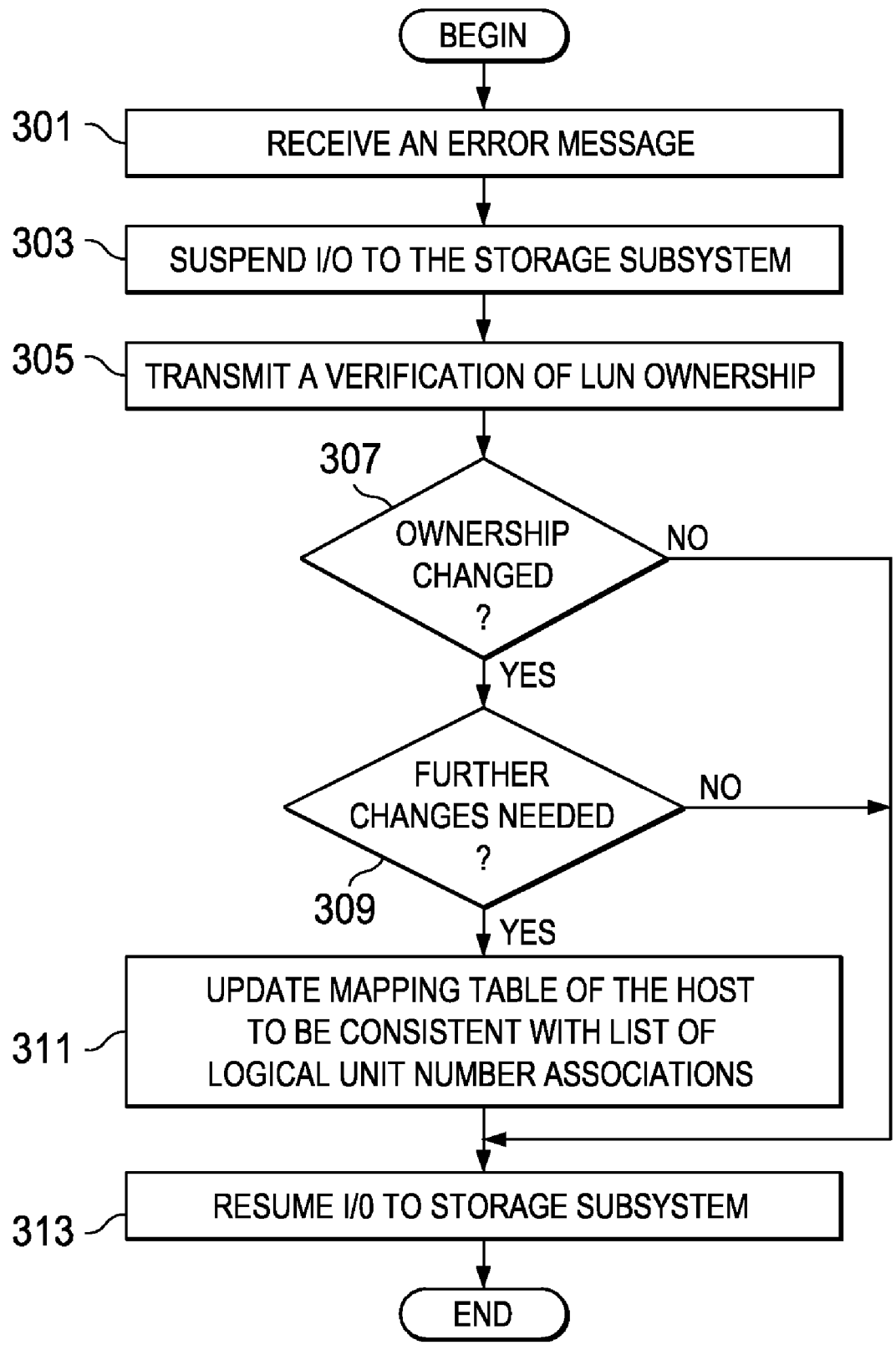
FIG. 3 is a flowchart in accordance with an illustrative embodiment of the invention.

FIG. 3 is a flowchart in accordance with an illustrative embodiment of the invention. Initially, a host receives an error message that corresponds with a device of the storage subsystem entering a quiesced state (step 301). An error message is a message transmitted by a storage controller to indicate a status of a storage subsystem component. Error messages can include SCSI error messages, for example, messages that indicate that quiescence among applicable storage media is in progress or achieved. A commonly used code for such a message is 0x8B02 (hexadecimal format), for example, message 251 of FIG. 2. Next, the host suspends I/O to the storage subsystem (step 303). The mechanism for suspending I/O can be to set a configuration bit. The processes of the host can check the configuration bit prior to flushing buffered write operations. Next, the host may transmit a verification of logical unit (LUN) ownership query to the storage subsystem (step 305). Such a query can be a SCSI check condition message having an autosense buffer containing 0x8B02.

Next, the host determines whether ownership between a host and a logical unit on a storage controller of the storage subsystem has changed (step 307). The host may make this determination in three of steps. First, the host may obtain ownership data from a mapping table of the host, for example, mapping table 219 of FIG. 2. The host may obtain such ownership data by transmitting a Small Computer System Interface (SCSI) command to discover current ownership relationships of the storage subsystem using, for example, discover current ownership message 253 of FIG. 2. The current ownership message may be a SCSI mode sense command to mode page 2C. As may be appreciated, other forms of discover current ownership messages may be used. Second, the host may receive a list of logical unit number associations with at least one of the at least two storage controllers from the storage subsystem. Third, the host may detect a difference between the mapping table of the host and the list of logical unit number associations.

Next, the host may determine if further changes are needed (step 309). This determination may be performed in two sub-steps. First, the host may determine a logical unit of the mapping table associated with a first controller of the at least two controllers. Second, the host may determine the logical unit of a list of logical unit number associations associated with a second storage controller, wherein the first storage controller is distinct from the second storage controller. Accordingly, the host may assess that the ownership relationships available in the host's mapping table differ from the ownership relationships available in the list of LUN associations with controllers. For example, such differences may be detected between mapping table 217 of FIG. 2, and list of LUN associations with controllers 255.

A positive outcome to step 309 indicates changes are needed. If changes are needed, the host may update the mapping table of the host to be consistent with the list of logical unit number associations (step 311). The host may perform this step by modifying logical unit (LUN) ownership in the mapping table by using a PCM command sequence. For example, the controller PCM may issue the command to verify logical unit ownership. The controller PCM may update the LUN ownership by switching the mapping table in memory to point to the new storage controller. The host may then resume I/O the storage subsystem (step 313). Processing terminates thereafter.

On the other hand, negative results to steps 307 and 309 may cause the host to resume I/O to from the host to the storage subsystem (step 313). The I/O can then be routinely exchanged between the host and the storage subsystem. The I/O can be, for example, flushes of cached write operations from within the host. Processing terminates thereafter.

The illustrative embodiments permit a host to more directly resume I/O contemporaneous with errors detection from the storage subsystem. Accordingly, a system of hosts and storage controllers may be devoted to spend a relatively greater proportion of time transferring data between LUNs and hosts as compared to maintaining or adjusting the state of the storage controllers.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for revising logical unit ownership in a host, the method comprising:

receiving an error message by the host from a storage subsystem having at least two storage controllers and at least one logical unit coupled to at least one of the storage controllers;

suspending by the host I/O from the host to the storage subsystem;

transmitting by the host a verification of logical unit ownership query to the storage subsystem;

determining by the host that ownership between the host and a logical unit on the at least one of the storage controllers has changed from a mapping table at the host;

responsive to a determination by the host that ownership has changed, updating by the host ownership in the mapping table at the host to reflect the ownership between the host and the logical unit; and resuming I/O from the host to the storage subsystem, wherein the host routinely exchanges I/O with the storage subsystem.

2. The computer implemented method of claim 1, wherein determining by the host that ownership between the host and the logical unit on the storage controller of the storage subsystem has changed comprises:

obtaining ownership data from a mapping table at the host;

receiving by the host a list of logical unit number associations with at least one of the at least two storage controllers from the storage subsystem; and detecting a difference between the mapping table at the host and the list of logical unit number associations.

3. The computer implemented method of claim 2, wherein obtaining comprises:

transmitting a Small Computer System Interface (SCSI) command to the storage subsystem.

4. The computer implemented method of claim 3, further comprising:

responsive to detecting a difference between the mapping table at the host and the list of logical unit number associations, updating the mapping table at the host to be consistent with the list of logical unit number associations.

5. The computer implemented method of claim 3, wherein detecting comprises:

determining the logical unit of the mapping table associated with a first storage controller of the at least two controllers; and determining the logical unit of a list of logical unit number associations associated with a second storage controller, wherein the first storage controller is distinct from the second storage controller.

6. The computer implemented method of claim 4, wherein the at least two or more storage controllers are fibre channel controllers.

7. The computer implemented method of claim 2, further comprising:

responsive to detecting a difference between the mapping table at the host and the list of logical unit number associations, updating the mapping table at the host to be consistent with the list of logical unit number associations.

8. A computer program product for revising logical unit ownership in a host, the computer program product comprising:

a computer usable medium selected from the group consisting of electronic medium, magnetic medium, optical medium, electromagnetic medium, semiconductor medium, a semiconductor memory, a solid state memory, a magnetic tape, a removable computer diskette, a random access memory (RAM), a read-only memory (ROM), a rigid magnetic disk and an optical disk, the computer usable medium having computer usable program code embodied therewith, the computer usable medium program product comprising:

computer usable program code configured to receive by the host an error message from a storage subsystem having at least two storage controllers and at least one logical unit coupled to at least one of the storage controllers;

computer usable program code configured to suspend by the host I/O from the host to the storage subsystem;

computer usable program code configured to transmit by the host a verification of logical unit ownership query to the storage subsystem;

computer usable program code configured to determine by the host that ownership between the host and a logical unit on the at least one of the storage controllers of the storage subsystem has changed from the mapping table at the host;

computer usable program code configured to update by the host ownership in a mapping table at the host to reflect the ownership between the host and the logical unit, responsive to a determination by the host that ownership has changed; and computer usable program code configured to resume I/O from the host to the storage subsystem, wherein the host routinely exchanges I/O with the storage subsystem.

9. The computer program product of claim 8, wherein the computer usable program code configured to determine by the host that ownership between the host and the logical unit on the storage controller of the storage subsystem has changed comprises:

computer usable program code configured to obtain ownership data from a mapping table at the host;

computer usable program code configured to receive a list of logical unit number associations with at least one of the at least two storage controllers from the storage subsystem; and computer usable program code configured to detect a difference between the mapping table at the host and the list of logical unit number associations.

10. The computer program product of claim 9, wherein the computer usable program code configured to obtain comprises:

computer usable program code configured to transmit a Small Computer System Interface (SCSI) command to the storage subsystem.

11. The computer program product of claim 10, further comprising:

computer usable program code configured to update the mapping table at the host to be consistent with the list of logical unit number associations, responsive to detecting a difference between the mapping table at the host and the list of logical unit number associations.

12. The computer program product of claim 10, wherein the computer usable program code configured to detect comprises:

computer usable program code configured to determine the logical unit of the mapping table associated with a first storage controller of the at least two controllers; and computer usable program code configured to determine the logical unit of a list of logical unit number associations associated with a second storage controller, wherein the first storage controller is distinct from the second storage controller.

13. The computer program product of claim 11, wherein the at least two or more storage controllers are fibre channel controllers.

14. The computer program product of claim 9, further comprising:

responsive to detecting a difference between the mapping table at the host and the list of logical unit number associations, computer usable program code configured to update the mapping table at the host to be consistent with the list of logical unit number associations.

15. A host data processing system comprising:
a bus;
a storage device connected to the bus, wherein computer usable code is located in the storage device;
a communication unit connected to the bus;
a processing unit connected to the bus, wherein the processing unit executes the computer usable code for revising logical unit ownership in the host, wherein the processing unit executes the computer usable program code to receive an error message from a storage subsystem having at least two storage controllers and at least one logical unit coupled to at least one of the storage controllers; suspend I/O from the host to the storage subsystem; transmit a verification of logical unit ownership query to the storage subsystem; determine by the host that ownership between the host and a logical unit on the at least one of the storage controllers of the storage subsystem has changed from a mapping table at the host; responsive to a determination that ownership has changed, update ownership in the mapping table at the host to reflect the ownership between the host and the logical unit; and resume I/O from the host to the storage subsystem, wherein the host routinely exchanges I/O with the storage subsystem.

16. The host data processing system of claim 15, wherein in executing computer usable program code to determine by the host that ownership between the host and the logical unit on the storage controller of the storage subsystem has changed, the processing unit executes computer usable program code to obtain ownership data from a mapping table at the host; receive a list of logical unit number associations with at least one of the at least two storage controllers from the storage subsystem; and detect a difference between the mapping table at the host and the list of logical unit number associations.

17. The host data processing system of claim 16, wherein in executing computer usable program code to obtain, the processing unit executes computer usable program code to transmit a Small Computer System Interface (SCSI) command to the storage subsystem.

18. The host data processing system of claim 17, wherein the processing unit further executes computer usable program code to, responsive to detecting a difference between the mapping table at the host and the list of logical unit number associations, update the mapping table at the host to be consistent with the list of logical unit number associations.

19. The host data processing system of claim 17, wherein in executing computer usable program code to detect, the processing unit executes computer usable program code to determine the logical unit of the mapping table associated with a first storage controller of the at least two controllers; and determine the logical unit of a list of logical unit number associations associated with a second storage controller, wherein the first storage controller is distinct from the second storage controller.

20. The host data processing system of claim 16, wherein the processing unit further executes computer usable program code to, responsive to detecting a difference between the mapping table at the host and the list of logical unit number associations, update the mapping table at the host to be consistent with the list of logical unit number associations.

* * * * *